(12) United States Patent
Yamaguchi et al.

(10) Patent No.: US 11,360,110 B2
(45) Date of Patent: Jun. 14, 2022

(54) SAMPLE TEST AUTOMATION SYSTEM (71) Applicant: Hitachi High-Technologies Corporation, Tokyo (JP)

(72) Inventors: Shigeki Yamaguchi, Tokyo (JP); Naoto Tsujimura, Tokyo (JP); Tomoyuki Nemoto, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 176 days.

(21) Appl. No.: 16/333,862

(22) PCT Filed: Jul. 18, 2017

(86) PCT No.: PCT/JP2017/025944
§ 371 (c)(1),
(2) Date: Mar. 15, 2019

(87) PCT Pub. No.: WO2018/055885
PCT Pub. Date: Mar. 29, 2018

(65) Prior Publication Data
US 2019/0265261 A1  Aug. 29, 2019

(30) Foreign Application Priority Data
Sep. 23, 2016 (JP) .............................. JP2016-185306

(51) Int. Cl.
*G01N 35/04* (2006.01)
*B01L 9/00* (2006.01)

(52) U.S. Cl.
CPC ............... *G01N 35/04* (2013.01); *B01L 9/00* (2013.01); *G01N 2035/0465* (2013.01); *G01N 2035/0475* (2013.01)

(58) Field of Classification Search
CPC .................................. B01L 9/00; G01N 35/04
See application file for complete search history.

(56) References Cited

U.S. PATENT DOCUMENTS 4,699,766 A   10/1987  Yamashita
4,801,248 A   1/1989   Tojo et al.
(Continued)

FOREIGN PATENT DOCUMENTS

DE   17 98 481 A1    6/1976
DE   198 53 184 A1   6/2000
(Continued)

OTHER PUBLICATIONS

"Annular LED Pendant Light Chandelier Lighting Ambient Light—LED Integrated Dimmable With Remote Control." Heparts, www.hepartshome.com/products/annular-led-pendant-light-chandelier-lighting-ambient-light-led-integrated-dimmable-with-remote-control. (Year: 2021).*
(Continued)

*Primary Examiner* — Samuel P Siefke
*Assistant Examiner* — Tingchen Shi
(74) *Attorney, Agent, or Firm* — Crowell & Moring LLP (57) ABSTRACT

The present invention is provided with: an automatic analysis device 200 for performing an analysis process to analyze a specimen that is to be analyzed; a specimen pre-processing module 100 for performing pre-processing to cause the specimen to enter a state in which the analysis process can be performed; a main conveyance line 161 for conveying a specimen container carrier 10 which accommodates the specimen that is to be analyzed and in which at least one specimen container can be mounted; and annular conveyance lines 111, 121, 131, 141, 151, 411 that are disposed adjacent to the main conveyance line 161 and that are moreover disposed so as to be capable of transferring the specimen container carrier 10 to and from the main conveyance line 161, the annular conveyance lines 111, 121, 131, 141, 151, 411 being capable of circulating and conveying the specimen container carrier 10 separately without the use of (Continued)

another conveyance line (e.g., a return line 162). This makes it possible to maintain flexibility in conveyance of specimens while suppressing increases in device surface area.

6 Claims, 7 Drawing Sheets

(56) References Cited

U.S. PATENT DOCUMENTS

| | | | | |
|---|---|---|---|---|
| 5,623,415 | A | * | 4/1997 | O'Bryan .............. G01N 35/021 198/617 |
| 9,236,236 | B2 | * | 1/2016 | DeWitte .............. H01J 49/0031 |
| 2004/0186360 | A1 | * | 9/2004 | Suzuki ................ G01N 35/026 600/310 |
| 2008/0271546 | A1 | | 11/2008 | Miller et al. |
| 2012/0177547 | A1 | | 7/2012 | Fukugaki et al. |
| 2013/0323758 | A1 | * | 12/2013 | Oguri ..................... G01N 21/76 435/7.72 |

FOREIGN PATENT DOCUMENTS

| | | | |
|---|---|---|---|
| JP | 61-274268 | A | 12/1986 |
| JP | 63-65177 | A | 3/1988 |
| JP | 1-168866 | U | 11/1989 |
| JP | 11-500224 | A | 1/1999 |
| JP | 2004-279357 | A | 10/2004 |
| JP | 2010-526289 | A | 7/2010 |
| JP | 2010-181384 | A | 8/2010 |
| JP | 2013-148428 | A | 8/2013 |
| JP | 2013148428 | A * | 8/2013 |
| JP | 2014-85148 | A | 5/2014 |
| JP | 2015-78923 | A | 4/2015 |
| WO | WO-0031549 | A1 * | 6/2000 ............. G01N 35/04 |
| WO | WO 2011/040197 | A1 | 4/2011 |
| WO | WO 2012/114675 | A1 | 8/2012 |

OTHER PUBLICATIONS

International Preliminary Report on Patentability (PCT/IB/338 & PCT/IB/373) issued in PCT Application No. PCT/JP2017/025944 dated Apr. 4, 2019, including English translation of document C2 (Japanese-language Written Opinion (PCT/ISA/237) previously filed on Mar. 15, 2019) (nine (9) pages).

International Search Report (PCT/ISA/210) issued in PCT Application No. PCT/JP2017025944 dated Aug. 29, 2017 with English translation (four (4) pages).

Japanese-language Written Opinion (PCT/ISA/237) issued in PCT Application No. PCT/JP2017025944 dated Aug. 29, 2017 (five (5) pages).

Extended European Search Report issued in European Application No. 17852666.1 dated May 27, 2020 (six pages).

Japanese language Office Action issued in Japanese Application No. 2018-540652 dated Feb. 2, 2021 with English translation (10 pages).

* cited by examiner

SAMPLE TEST AUTOMATION SYSTEM

TECHNICAL FIELD

The present invention relates to a sample test automation system for performing qualitative and quantitative analysis of specific components contained in a biological specimen, such as blood or urine.

BACKGROUND ART

Recently, in the medical field, labor-saving of inspection work has been progressed by introducing various types of automated equipment, and for example, for qualitative and quantitative analysis of specific components contained in a biological specimen, such as blood or urine (hereinafter, referred to as specimen), a sample test automation system and the like are used.

As a technique related to such a sample test automation system, for example, PTL 1 (WO 2011/040197) discloses a sample test automation system including: a main conveyance line that conveys a specimen holding tool holding at least one specimen; a plurality of specimen processing units disposed along the main conveyance line; a rack stocker for supplying and recovering an empty specimen holding tool to be conveyed to the main conveyance line; and an empty rack conveyance line disposed in parallel with the main conveyance line, in which the empty rack conveyance line includes a conveyance line that is disposed at a position lower than the main conveyance line and connects the rack stocker and the empty rack conveyance line.

CITATION LIST

Patent Literature

PTL 1: WO 2011/040197

SUMMARY OF INVENTION

Technical Problem

In the sample test automation system, pre-processing, such as centrifugation processing, plug opening processing, or dispensing processing, is performed before an analysis process, but the type of necessary pre-processing varies depending on a target inspection type. Further, a specimen (so-called urgent specimen) having higher urgency than an ordinary specimen needs to perform the pre-processing with a priority than other ordinary specimens. Therefore, high flexibility is required for conveying the specimens between units performing each processing in the sample test automation system.

Here, for example, as described in the technique above, a technique in which, in addition to a main conveyance line or a return line, an emergency overtaking line for preferentially conveying and processing an urgent specimen, a branch line for connecting the main conveyance line and the emergency overtaking line, and the like are provided to secure the flexibility in conveyance of the specimen, is known.

However, in order to use such a configuration, various related mechanisms are required, and thus, the sample test automation system tends to become larger and more expensive. In recent years, the demand for introducing the sample test automation system has been increasing even in the medium or small scale facilities. At such facilities, the installation area or introduction budget of the sample test automation system is restricted compared to large scale facilities, and it is expected to reduce the installation area and accompanying introduction cost.

The present invention has been made in view of the circumstances above, and an object of the present invention is to provide a sample test automation system capable of securing flexibility in conveyance of specimens while suppressing increases in the installation area.

Solution to Problem

In order to achieve the above-described object, the present invention is provided with: an analysis device for performing an analysis process to analyze a specimen that is to be analyzed; a pre-processing device for performing pre-processing to cause the specimen to enter a state where the analysis process can be performed; a main conveyance line for conveying a specimen container carrier which accommodates the specimen that is to be analyzed and in which at least one specimen container can be loaded; and annular conveyance lines that are disposed adjacent to the main conveyance line, are disposed so as to be capable of transferring the specimen container carrier to and from the main conveyance line, and are capable of circulating and conveying the specimen container carrier separately without using another conveyance line.

Advantageous Effects of Invention

According to the present invention, it is possible to secure flexibility in conveyance of specimens while suppressing increases in the installation area.

DESCRIPTION OF EMBODIMENTS

Hereinafter, embodiments of the present invention will be described with reference to the drawings.

Figure 1:
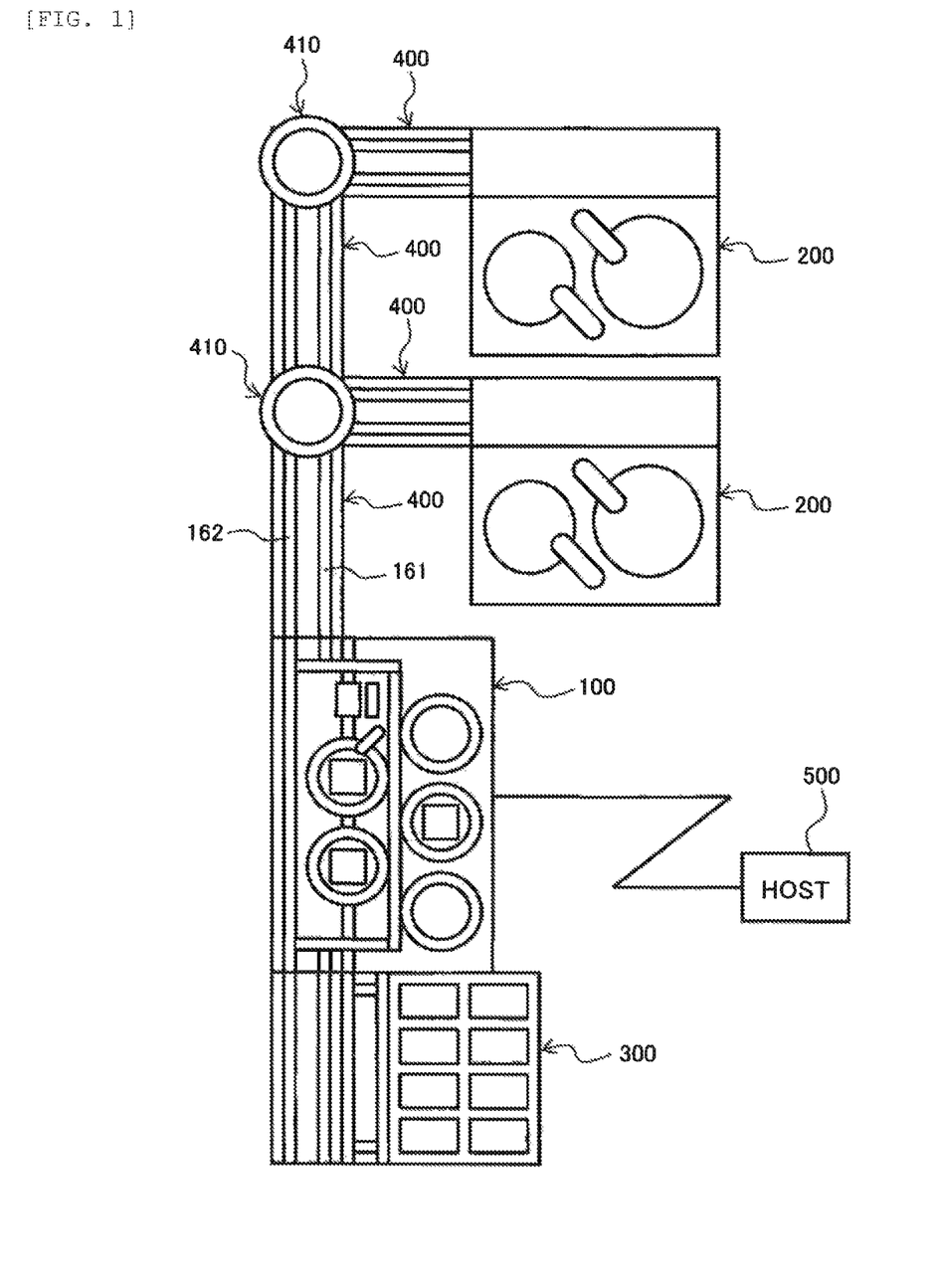
FIG. 1 is a view schematically illustrating the overall configuration of a sample test automation system.

FIG. 1 is a view schematically illustrating the overall configuration of a sample test automation system according to the embodiment.

In FIG. 1, the sample test automation system is roughly configured with a specimen pre-processing module 100, an automatic analysis device 200, a specimen input and accommodation module 300, a conveyance line unit 400, a conveyance line connecting unit 410, and a host computer 500.

The specimen pre-processing module (pre-processing device) 100 performs pre-processing to cause a specimen that is to be analyzed to enter a state where an analysis process can be performed by the automatic analysis device (analysis device) 200. A specimen container carrier 10 in which a specimen container on which the pre-processing is performed in the specimen pre-processing module (pre-processing device) 100 is mounted is conveyed to the automatic analysis device 200 to execute the analysis process, and then, the analysis result is sent to the host computer 500.

The specimen input and accommodation module 300 is one of the extension modules for extending the function of the specimen pre-processing module 100, and is a module in which the specimen container accommodating the specimen to be analyzed in the sample test automation system is mounted on a specimen container tray (not illustrated) or the like to be input thereto. The specimen input and accommodation module 300 remounts the specimen container between the specimen container tray capable of loading a plurality of specimen containers and the specimen container carrier 10 (refer to following FIG. 2 and the like) capable of loading at least one specimen container and carried in the conveyance of the specimen container in the sample test automation system. In the specimen input and accommodation module 300, the specimen container loaded on the specimen tray and input thereto is remounted on the specimen container carrier 10 and is conveyed to the specimen pre-processing module 100 in the subsequent stage via a main conveyance line 161 (will be described later), and the specimen container is remounted on and stored in the specimen tray from the specimen container carrier 10 returned via a return line 162 (will be described later).

In addition, in the present embodiment, as the specimen container carrier 10 used for conveying the specimen container in the sample test automation system, a carrier loading and conveying one specimen container is described as an example. In addition, although not illustrated in the present example, a system can be configured by combining, for example, a centrifugal module that performs centrifugal separation with respect to a specimen requiring centrifugal separation, a specimen stocker that refrigerates and stores a specimen, and the like as an extension module with the specimen pre-processing module 100.

The conveyance line unit 400 includes the main conveyance line 161 and the return line 162 that are for conveying the specimen container carrier 10 loading a specimen between the specimen pre-processing module 100 and the automatic analysis device 200. In the present embodiment, one end of each of the plurality of conveyance line units 400 is connected to the specimen pre-processing module 100 and the automatic analysis device 200, respectively, and the other end thereof is connected via the conveyance line connecting unit 410 to connect the specimen pre-processing module 100 and the automatic analysis device 200, thereby enabling the specimen container carrier 10 to be conveyed. The main conveyance line 161 and the return line 162 of the conveyance line units 400 are continuously connected respectively to the main conveyance line 161 and the return line 162 of a connection destination (for example, specimen pre-processing module 100). In addition, the main conveyance line 161 and the return line 162 are configured with, for example, a belt line driven by a motor or the like.

The host computer 500 controls the overall operation of the sample test automation system, and by controlling the operation of each mechanism constituting the sample test automation system, the host computer 500 performs control, such as, management and conveyance of the input specimen (specimen container) to be analyzed, and display and storage of the analysis results.

Figure 2:
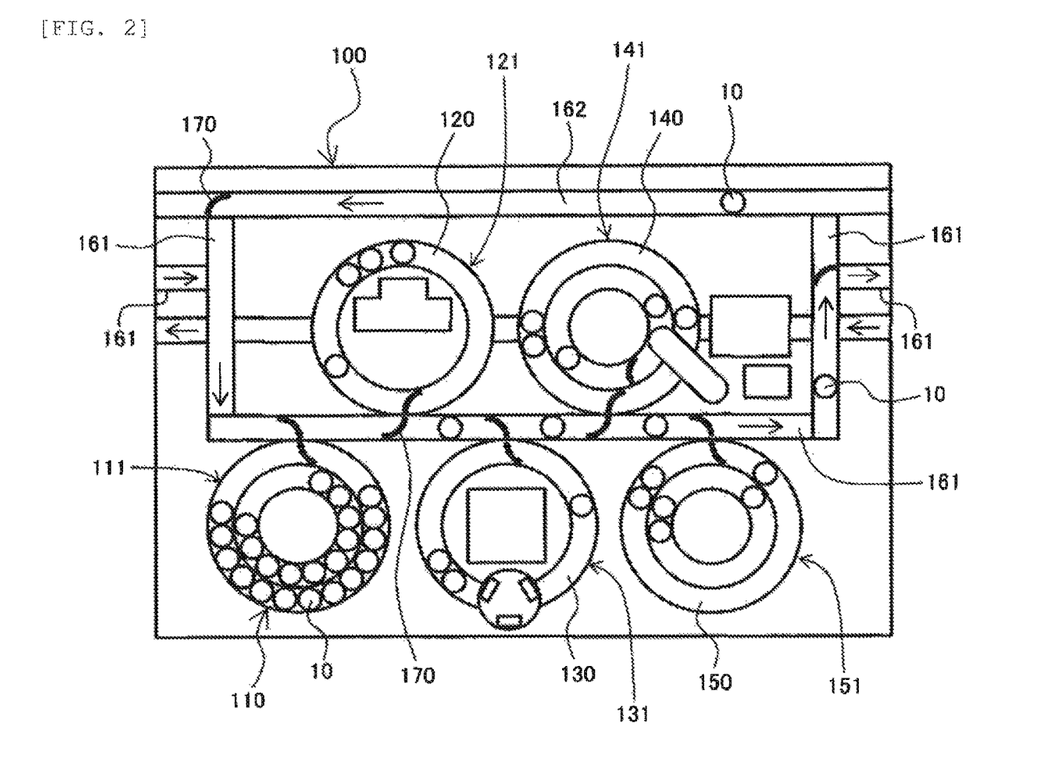
FIG. 2 is a view schematically illustrating a configuration of a specimen pre-processing module.

FIG. 2 is a view schematically illustrating a configuration of the specimen pre-processing module.

In FIG. 2, the specimen pre-processing module 100 is roughly configured with the main conveyance line 161 for conveying the specimen container carrier 10 from the specimen input and accommodation module 300 side to the automatic analysis device 200 side; the return line 162 for conveying the specimen container carrier 10 from the automatic analysis device 200 side to the specimen input and accommodation module 300 side; and a specimen input unit 110, a specimen confirmation unit 120, a plug opening unit 130, a dispensing unit 140, and an accommodation unit 150, which are disposed along the main conveyance line 161. The specimen input unit 110, the specimen confirmation unit 120, the plug opening unit 130, the dispensing unit 140, and the accommodation unit 150 respectively include annular conveyance lines 111, 121, 131, 141, and 151 (which will be described in detail later) which are circulation conveyance paths that are disposed adjacent to the main conveyance line 161, are disposed so as to be capable of transferring the specimen container carrier 10 to and from the main conveyance line 161, and are capable of circulating and conveying the specimen container carrier 10 separately without using another conveyance line.

In addition, each of the annular conveyance lines 111, 121, 131, 141, and 151 is disposed in a zigzag manner (horizontally alternating along the main conveyance line 161) with respect to the main conveyance line 161. By adopting a zigzag arrangement, it is possible to overlap approximately ⅓ of the width in a direction along the main conveyance line 161 of an annular structure constituting the annular conveyance line. Assuming that the width of the entire system is W, the width of each processing unit is w, and the number of processing units is n, when each processing unit is disposed adjacent to each other as in a general pre-processing system, $W = n \times w$, whereas $W = (2n+1) \times w/3$ when each of the processing units is arranged in a zigzag manner as in the present embodiment. Accordingly, for example, in the case of a system having four processing units, it is possible to save the space of the overall width of the system to approximately 75%.

The specimen input unit 110 is a unit for conveying the specimen (specimen container) from the outside into the sample test automation system. After an operator installs the specimen container in the empty specimen container carrier 10 on the specimen input unit 110 or inputs the specimen container loaded on the specimen container carrier 10 into the specimen input unit 110, by inputting an instruction to start each processing via the host computer 500 or the like, the specimen container carrier 10 in which the specimen container is loaded is conveyed on the main conveyance line 161 to be carried to each processing unit. In addition, as in the present embodiment, when the extension module having an input function, such as the specimen input and accommodation module 300 is connected to the specimen pre-processing module 100, it is also possible to use the specimen input unit 110 as an interruption input unit to input a specimen having a high priority.

The specimen confirmation unit 120 is a unit that measures and collects information related to a specimen, such as specimen type, specimen ID, specimen quantity, and color information of a specimen accommodated in the specimen container, and various types of information are appropriately transferred to and from the host computer 500.

The plug opening unit 130 is a unit that performs plug opening processing for removing a plug that closes an opening portion of the specimen container to cause a state where processing in the subsequent stage (for example, division of specimens in the dispensing unit 140 and the analysis process in the automatic analysis device 200) is possible.

The dispensing unit 140 is a unit for dispensing and dividing the specimen accommodated in the specimen container (parent specimen) into another specimen container (child specimen). As the specimen container used as a child specimen, for example, a container supplied as a consumable item is used.

The accommodation unit 150 is a unit that classifies and accommodates the specimen containers (the parent specimen and the child specimen) as necessary. As the specimen containers stored in the accommodation unit 150, in addition to the specimen container that is input by the specimen input and accommodation module 300 and conveyed on the main conveyance line 161, there are a specimen container on which the pre-processing is performed in the specimen pre-processing module 100 and a specimen container which is not accommodated in the specimen input and accommodation module 300 among specimen containers which have been returned from the automatic analysis device 200 side via the return line 162. The specimen containers accommodated in the accommodation unit 150 are conveyed to the automatic analysis device 200 side via the main conveyance line 161 in the order of a predetermined analysis process. In addition, when re-inspection is required for the specimen of the specimen container accommodated in the accommodation unit 150, the specimen container is conveyed again to the automatic analysis device 200 side via the main conveyance line 161.

Apart in the main conveyance line 161 further on the upstream side than the specimen input unit 110, the specimen confirmation unit 120, the plug opening unit 130, the dispensing unit 140, and the accommodation unit 150 is disposed (connected) so as to be adjacent to the return line 162. At the connection part of the return line 162 with the main conveyance line 161, a branch arm 170 is disposed. When the branch arm 170 is moving on the return line 162, the specimen container carrier 10 conveyed on the return line 162 is guided by the branch arm 170 and conveyed to the main conveyance line 161 (that is, a conveyance path of the specimen container carrier 10 is switched to the main conveyance line 161 side). In addition, when the branch arm 170 is retracted from the return line 162, the specimen container carrier 10 conveyed on the return line 162 is directly conveyed as it is on the return line 162 to the downstream side (that is, the conveyance path of the specimen container carrier 10 is switched to the return line 162 side). Accordingly, it is possible to convey the specimen container carrier 10 conveyed on the return line 162 to the specimen input unit 110, the specimen confirmation unit 120, the plug opening unit 130, the dispensing unit 140, and the accommodation unit 150 of the specimen pre-processing module 100.

Further, a part in the main conveyance line 161 further on the downstream side than the specimen input unit 110, the specimen confirmation unit 120, the plug opening unit 130, the dispensing unit 140, and the accommodation unit 150 is disposed (connected) so as to be adjacent to the return line 162. The branch arm 170 is disposed further on the upstream side than the connection part of the main conveyance line 161 with the return line 162. When the branch arm 170 is moving on the main conveyance line 161, the specimen container carrier 10 conveyed on the main conveyance line 161 is guided by the branch arm 170 and conveyed to the main conveyance line 161 on the automatic analysis device 200 side (that is, the conveyance path of the specimen container carrier 10 is switched to the main conveyance line 161 side). In addition, when the branch arm 170 is retracted from the main conveyance line 161, the specimen container carrier 10 conveyed on the main conveyance line 161 is conveyed on the return line 162 (that is, the conveyance path of the specimen container carrier 10 is switched to the return line 162 side). Accordingly, it is possible to convey the specimen container carrier 10 that is conveyed by the main conveyance line 161 to the specimen input and accommodation module 300, and the specimen input unit 110, the specimen confirmation unit 120, the plug opening unit 130, the dispensing unit 140 and the accommodation unit 150 of the specimen pre-processing module 100 without being conveyed to the automatic analysis device 200 side.

Here, with reference to FIGS. 3 to 5, the annular conveyance lines 111, 121, 131, 141 and 151 of the specimen input unit 110, the specimen confirmation unit 120, the plug opening unit 130, the dispensing unit 140, and the accommodation unit 150 in the specimen pre-processing module 100 will be described.

Figure 3:
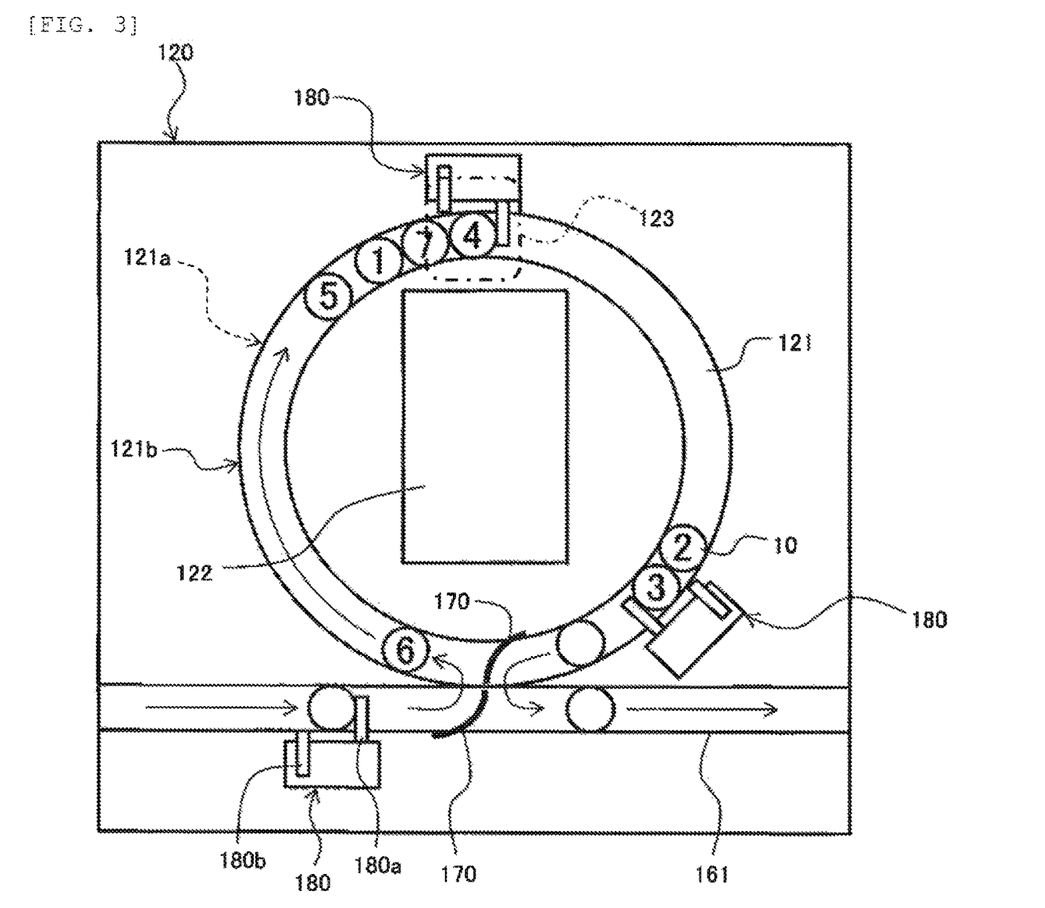
FIG. 3 is a view schematically illustrating a configuration of a specimen confirmation unit, and is a view illustrating a case where a specimen container carrier is transferred to and from a main conveyance line and an annular conveyance line.
Figure 4:
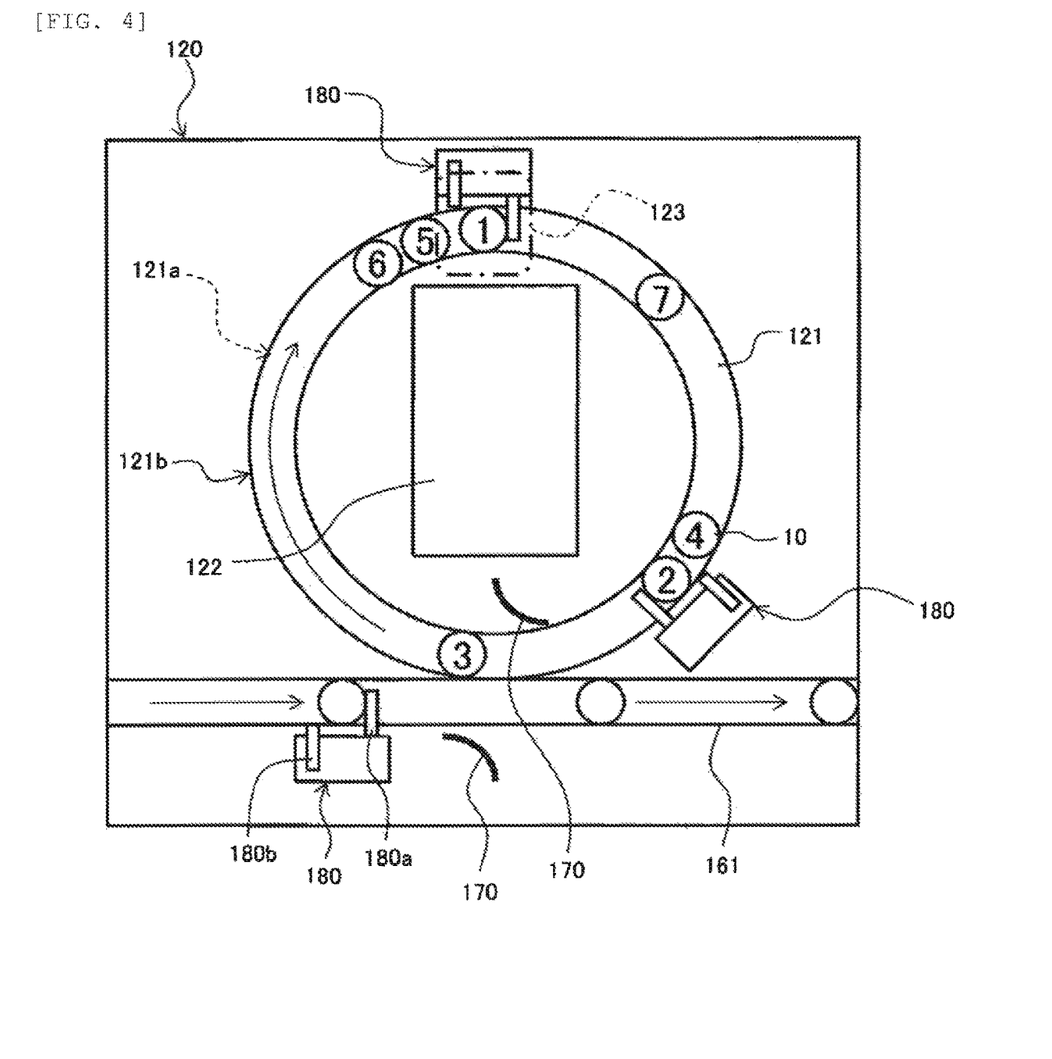
FIG. 4 is a view schematically illustrating a configuration of the specimen confirmation unit, and is a view illustrating a case where the specimen container carrier is not transferred to and from the main conveyance line and the annular conveyance line.

FIGS. 3 and 4 are views schematically illustrating a configuration of the specimen confirmation unit, FIG. 3 illustrates a case where the specimen container carrier is transferred to and from the main conveyance line and the annular conveyance line, and FIG. 4 illustrates a case where the specimen container carrier is not transferred to and from the main conveyance line and the annular conveyance line. In addition, in FIGS. 3 and 4, in order to describe an aspect of the conveyance of the specimen container carrier 10, numbers "1" to "7" are assigned to each specimen container carrier 10 in accordance with the priority of the processing.

In FIGS. 3 and 4, the specimen confirmation unit 120 includes the annular conveyance line 121 that is disposed adjacent to the main conveyance line 161, is disposed so as to be capable of transferring the specimen container carrier 10 to and from the main conveyance line 161, and is capable of circulating and conveying the specimen container carrier 10 separately without using another conveyance line (return line 162 or the like).

The annular conveyance line 121 is configured with a disk 121a (corresponding to a conveyance disk 1 in FIGS. 7 and 8 which will be described later) that rotates in a horizontal direction, and a guide rail 121b (corresponding to the guide rail 2 in FIGS. 7 and 8 which will be described later) that is disposed to surround the rotation center of the disk 121a and guides the movement of the specimen container carrier 10 on the disk 121a. When the specimen container carrier 10 is conveyed onto the disk 121a of the annular conveyance line 121, the specimen container carrier 10 is conveyed along the guide rail 121b by the friction between the disk 121a and the specimen container carrier 10 as the disk 121a rotates. In this manner, one of the merits of using the rotating disk 121a is that an annular conveyance line capable of circulating and conveying the specimen container carrier 10 can be realized with one driving motor and a simple structure. In addition, the annular conveyance line 121 may be an annular conveyance line as long as the specimen container carrier 10 can be separately circulated and conveyed. However, without being limited to the above-described configuration, the annular conveyance line 121 may be a one-shaft driven peripheral circuit which is in contact with the main conveyance line. For example, the annular conveyance line may be configured using a chain conveyor or the like. In addition, compared to a method of conveying a specimen by inserting the specimen container into a hole provided on a disk-shaped circumference and rotating the disk, by configuring the conveyance path itself as a peripheral circuit, the peripheral circuit has flexibility that makes it possible to convey in and out the specimen container carrier 10 during the operation (during the rotation) thereof.

The branch arm 170 is disposed at the adjacent part between the main conveyance line 161 and the annular conveyance line 121. As illustrated in FIG. 3, when the branch arm 170 is moving on the main conveyance line 161, the specimen container carrier 10 conveyed from the upstream side on the main conveyance line 161 is guided by the branch arm 170 and conveyed into the annular conveyance line 121. Similarly, when the branch arm 170 is moving on the annular conveyance line 121, the specimen container carrier 10 conveyed on the annular conveyance line 121 is guided by the branch arm 170 and conveyed out to the main conveyance line 161. In addition, when the branch arm 170 is retracted from the main conveyance line 161 and the annular conveyance line 121, the specimen container carrier 10 conveyed from the upstream side on the main conveyance line 161 is conveyed to the downstream side on the main conveyance line 161 as it is, and the specimen container carrier 10 conveyed on the annular conveyance line 121 is circulated and conveyed as it is on the annular conveyance line 121. Accordingly, it is possible to transfer the specimen container carrier 10 to and from the main conveyance line 161 and the annular conveyance line 121.

A separator 180 having a downstream side stopper 180*a* and an upstream side stopper 180*b* that is disposed further on the upstream side than the downstream side stopper 180*a* is disposed further on the upstream side than the adjacent part of the main conveyance line 161 to the annular conveyance line 121. The separator 180 limits the movement of the specimen container carrier 10 conveyed on the main conveyance line 161 to the downstream side by projecting the downstream side stopper 180*a* or the upstream side stopper 180*b* to the main conveyance line 161 and allows the movement of the specimen container carrier 10 to the downstream side by retracting the downstream side stopper 180*a* or the upstream side stopper 180*b* from the main conveyance line 161. The downstream side stopper 180*a* and the upstream side stopper 180*b* are disposed with an interval of one specimen container carrier 10, the movement of the subsequent specimen container carrier 10 is restricted by projecting the upstream side stopper 180*b* to the main conveyance line 161 in a state where the movement of the specimen container carrier 10 is restricted by the downstream side stopper 180*a*, the movement of only the specimen container carrier 10 between the downstream side stopper 180*a* and the upstream side stopper 180*b* is allowed to the downstream side by retracting the downstream side stopper 180*a* from the main conveyance line 161, and accordingly, it is possible to adjust (divide) the interval of the specimen container carriers 10 continuously conveyed on the main conveyance line 161 and to convey the specimen container carriers 10. In addition, by adjusting the interval between the specimen container carriers 10 conveyed to the adjacent part of the main conveyance line 161 to the annular conveyance line 121, the specimen container carrier 10 to be conveyed from the main conveyance line 161 to the annular conveyance line 121 can be easily adjusted.

Along the annular conveyance line 121, a processing unit 122 for performing the pre-processing with respect to the specimen container of the specimen container carrier 10 conveyed to a processing area 123 disposed on the annular conveyance line 121 is disposed, and a pre-processing unit that performs the pre-processing with respect to the specimen accommodated in the specimen container is configured by the processing unit 122 and the processing area 123. The separator 180 is disposed in the processing area 123, only a desirable specimen container carrier 10 is held in the processing area 123 or is allowed to be conveyed to the downstream side, and the conveyance of the subsequent specimen container carrier 10 can be restricted. An ID reading device (not illustrated) is disposed in the processing area 123, and the ID of the specimen container read by the ID reading device is sent to the host computer 500, and the necessity of processing in the processing unit 122 is determined. The pre-processing performed by the processing unit 122 is processing, such as determination of a specimen container, measurement of a specimen liquid volume, identification of the specimen color, and the like. In addition, when the pre-processing in the processing unit 122 is not performed, the specimen container carrier 10 is conveyed to the downstream side.

The separator 180 is disposed further on the downstream side than the processing area 123 of the annular conveyance line 121 and further on the upstream side than the adjacent part to the main conveyance line 161. By adjusting the interval between the specimen container carriers 10 to be conveyed to the adjacent part of the annular conveyance line 121 to the main conveyance line 161 by the separator 180, the specimen container carrier 10 to be conveyed from the annular conveyance line 121 to the main conveyance line 161 can be easily adjusted. At the position of the separator 180, the ID reading device (not illustrated) is disposed, and the ID of the specimen container read by the ID reading device is sent to the host computer 500. In addition, the specimen container carrier 10 in which the specimen container requiring processing in the processing unit 122 is loaded is circulated and conveyed on the annular conveyance line 121, and the specimen container carrier 10 with the specimen container not requiring processing in the processing unit 122 loaded is conveyed out to the main conveyance line 161.

In the specimen pre-processing module 100, an inquiry is made regarding processing priority information at the time of inquiry to the host computer 500 before conveying the specimen container carrier 10 into the specimen confirmation unit 120, and the priority of processing of the specimen containers (specimen container carriers 10) within the specimen confirmation unit 120 is assigned based on the information. In the specimen confirmation unit 120, for example, the processing by the processing unit 122 in the processing area 123 is executed in the order of the priority of the specimen containers conveyed on the annular conveyance line 121. In other words, only the specimen container with the priority "1" is processed, and the other specimens circulate the annular conveyance line 121 without performing the processing to be conveyed again to the processing area 123. For example, as illustrated in FIG. 3, when a specimen with priority "4" is positioned in the processing area 123 and two specimen containers with priority "7" and "1" respectively are positioned on the upstream side, two specimen containers of which priorities are not "1" (specimen containers with priority "4" and "7") are not processed in the processing area 123 and conveyed and circulated to the downstream side on the annular conveyance line 121. As illustrated in FIG. 4, when the specimen having the priority "1" arrives in the processing area 123, the processing unit 122 processes the specimen of the specimen container. Accordingly, the specimen container processing in the specimen confirmation unit 120 can be preferentially executed from the specimens with a higher priority. In addition, in the present embodiment, the order of processing is switched based on the priority, but the information that serves as a reference for switching the processing order is not limited to the priority. For example, in a centrifugal separation unit, in order to maintain the gravity balance in a centrifugal separator, there is a case where the specimen is set in the centrifugal separator so as to maintain the balance from the weight information of the specimen, and in this case, it is also conceivable to rearrange the order of the specimen containers based on the weight information of the specimen.

The plug opening unit 130 includes the annular conveyance line 131 configured similarly to the specimen confirmation unit 120. In other words, the annular conveyance line 131 is disposed adjacent to the main conveyance line 161, is disposed so as to be capable of transferring the specimen container carrier 10 to and from the main conveyance line 161, and is capable of circulating and conveying the specimen container carrier 10 separately without using another conveyance line (return line 162 or the like). Therefore, by a processing area (not illustrated) disposed on the annular conveyance line 131 and the performance of the pre-processing (here, plug opening processing) with respect to the specimen container of the specimen container carrier 10 conveyed to the processing area, a pre-processing unit that performs the pre-processing with respect to the specimen accommodated in the specimen container is configured. Other configurations, that is, the branch arm 170 disposed at the adjacent part between the main conveyance line 161 and the annular conveyance line 131, and each separator 180 are also provided in the same manner.

Figure 5:
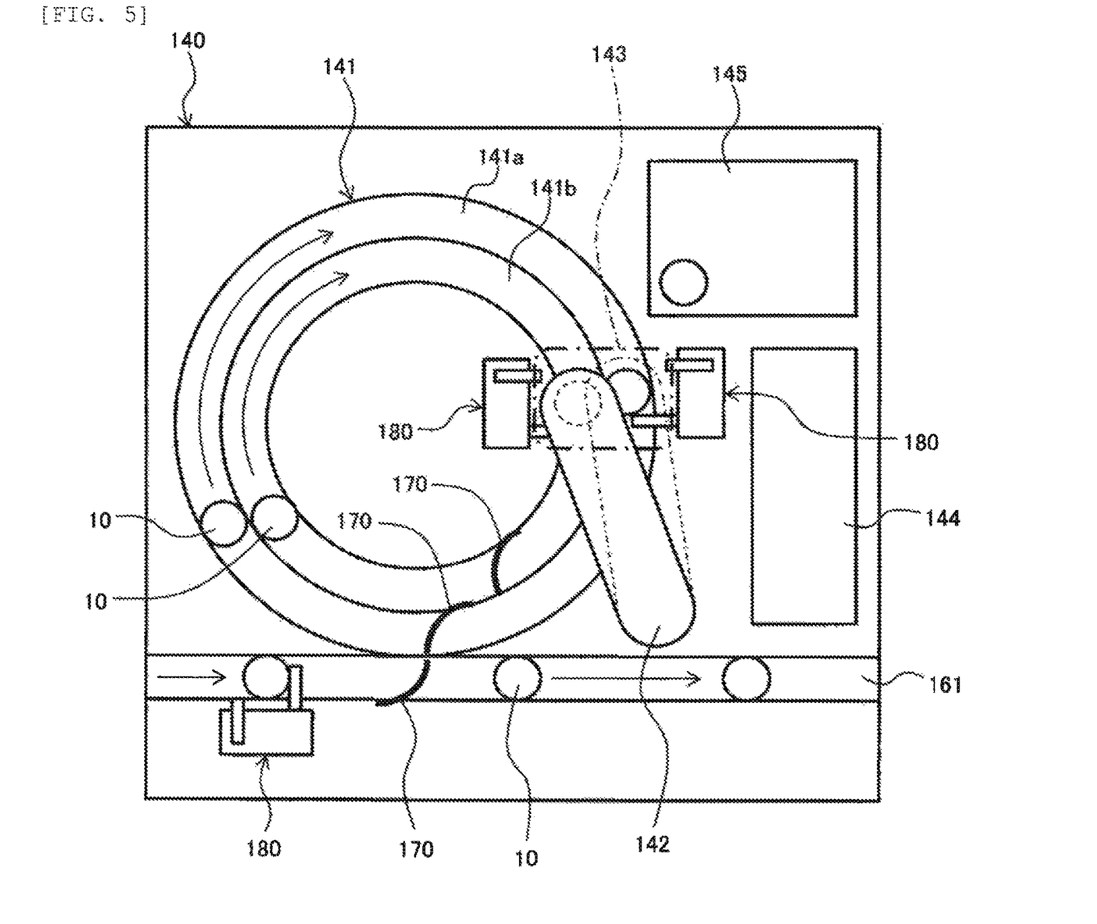
FIG. 5 is a view schematically illustrating a configuration of a dispensing unit.

FIG. 5 is a view schematically illustrating a configuration of the dispensing unit.

In FIG. 5, the dispensing unit 140 includes the annular conveyance line 141 that is disposed adjacent to the main conveyance line 161, is disposed so as to be capable of transferring the specimen container carrier 10 to and from the main conveyance line 161, and is capable of circulating and conveying the specimen container carrier 10 separately without using another conveyance line (return line 162 or the like). Further, the annular conveyance line 141 is configured with a first annular conveyance line 141*a* disposed adjacent to the main conveyance line 161 and a second annular conveyance line 141*b* disposed further on the inner side than the first annular conveyance line 141*a* and provided so as to be capable of transferring the specimen container carrier 10 to and from the first annular conveyance line 141*a*.

Similar to the annular conveyance line 121 of the specimen confirmation unit 120, the annular conveyance line 141 (the first and second annular conveyance lines 141*a* and 141*b*) includes a disk that rotates in the horizontal direction and a guide rail that is disposed to surround the rotation center of the disk and guides the movement of the specimen container carrier 10 on the disk.

The branch arm 170 is disposed at the adjacent part between the main conveyance line 161 and the annular conveyance line 141. When the branch arm 170 is moving on the main conveyance line 161, the specimen container carrier 10 conveyed from the upstream side on the main conveyance line 161 is guided by the branch arm 170 and conveyed into the annular conveyance line 141. Similarly, when the branch arm 170 is moving on the annular conveyance line 141, the specimen container carrier 10 conveyed on the annular conveyance line 141 is guided by the branch arm 170 and conveyed out to the main conveyance line 161. In addition, when the branch arm 170 is retracted from the main conveyance line 161 or the annular conveyance line 141, the specimen container carrier 10 conveyed from the upstream side on the main conveyance line 161 is conveyed to the downstream side as it is on the main conveyance line 161, and the specimen container carrier 10 conveyed on the annular conveyance line 141 is circulated and conveyed as it is on the annular conveyance line 141. Accordingly, it is possible to transfer the specimen container carrier 10 to and from the main conveyance line 161 and the annular conveyance line 141.

In addition, in the annular conveyance line 141, the branch arm 170 is also disposed in the second annular conveyance line 141*b*. In other words, when the branch arm 170 is moving on the second annular conveyance line 141*b*, the specimen container carrier 10 conveyed on the second annular conveyance line 141*b* is guided by the branch arm 170 and conveyed out to the first annular conveyance line 141*a*. In addition, when the branch arm 170 is retracted from the second annular conveyance line 141*b*, the specimen container carrier 10 conveyed on the second annular conveyance line 141*b* is circulated and conveyed as it is on the second annular conveyance line 141*b*.

Along the annular conveyance line 141, a processing unit 142 (hereinafter, referred to as specimen dispensing mechanism 142) for performing the pre-processing with respect to the specimen container of the specimen container carrier 10 conveyed to a processing area 143 disposed on the annular conveyance line 141 is disposed, and a pre-processing unit that performs the pre-processing (here, dispensing processing from the specimen container (parent specimen) to another specimen container (child specimen)) with respect to the specimen accommodated in the specimen container is configured by the specimen dispensing mechanism 142 and the processing area 143. The separator 180 is disposed in each of the first and second annular conveyance lines 141*a* and 141*b* in the processing area 143, only a desirable specimen container carrier 10 is held in the processing area 143 or is allowed to be conveyed to the downstream side, and the conveyance of the subsequent specimen container carrier 10 can be restricted.

An ID reading device (not illustrated) is disposed in the processing area 143, and the ID of the specimen container read by the ID reading device is sent to the host computer 500, and the necessity of the dispensing processing by the specimen dispensing mechanism 142 is determined. In the second inner annular conveyance line 141*b*, the specimen container carrier 10 in which the specimen container (child specimen) prepared by a child specimen container preparation unit 145 is mounted is conveyed. In the child specimen container preparation unit 145, an ID (for example, bar code label) that corresponds to the parent specimen is printed and affixed onto the specimen container (child specimen) taken out from a child specimen container storage (not illustrated). The specimen container (child specimen) to which the ID is affixed is loaded on the specimen container carrier 10 and installed in the second annular conveyance line 141*b* by a transfer mechanism (not illustrated). In addition, the preparation of the specimen container (child specimen) is started at the time when the dispensing processing is determined to be necessary for reading the ID performed before the parent specimen is conveyed into the dispensing unit 140.

The specimen dispensing mechanism 142 suctions the specimen from the specimen container (parent specimen) on the first annular conveyance line 141*a* held in the processing area 143 by the separator 180 and dispenses the specimen by discharging the specimen to the specimen container (child specimen) on the second annular conveyance line 141*b* held in the processing area 143 by the separator 180. In the specimen dispensing mechanism 142, disposable dispensing tips are used for parts that directly contact with the specimen. Dispensing tips are automatically supplied from a tip feeder 144, and the dispensing tips after the dispensing are discarded to a discard box (not illustrated) by a discarding operation of the specimen dispensing mechanism 142.

In the specimen pre-processing module 100, an inquiry is made regarding processing priority information at the time of inquiry to the host computer 500 before conveying the specimen container carrier 10 into the dispensing unit 140, and the processing priority of the specimen containers (specimen container carrier 10) within the dispensing unit 140 is assigned based on the information. In other words, in the dispensing unit 140, for example, the dispensing processing is executed by the specimen dispensing mechanism 142 in the processing area 143 in the order of the priority of the specimen containers (parent specimen) to be conveyed on the first annular conveyance line 141*a*. In addition, when the dispensing processing is not performed by the specimen dispensing mechanism 142 or when the specimen is not a specimen having the highest priority, or when the correspondence with the specimen container (child specimen) is incorrect, the specimen container carrier 10 is conveyed to the downstream side and circulated and conveyed.

The specimen input unit 110 and the accommodation unit 150 include the annular conveyance lines 111 and 151 configured similarly to the specimen confirmation unit 120, respectively.

In other words, the annular conveyance line 111 of the specimen input unit 110 is disposed adjacent to the main conveyance line 161, is disposed so as to be capable of transferring the specimen container carrier 10 to and from the main conveyance line 161, and is capable of circulating and conveying the specimen container carrier 10 separately without using another conveyance line (return line 162 or the like). Further, the annular conveyance line 111 is configured with a first annular conveyance line disposed adjacent to the main conveyance line 161 and a second annular conveyance line disposed further on the inner side than the first annular conveyance line and provided so as to be capable of transferring the specimen container carrier 10 to and from the first annular conveyance line. Other configurations, that is, the branch arm 170 disposed at the adjacent part between the main conveyance line 161 and the annular conveyance line 111, and each separator 180 are also provided in the same manner.

In addition, the annular conveyance line 151 of the accommodation unit 150 is disposed adjacent to the main conveyance line 161, is disposed so as to be capable of transferring the specimen container carrier 10 to and from the main conveyance line 161, and is capable of circulating and conveying the specimen container carrier 10 separately without using another conveyance line (return line 162 or the like). Other configurations, that is, the branch arm 170 disposed at the adjacent part between the main conveyance line 161 and the annular conveyance line 151, and each separator 180 are also provided in the same manner. Further, the annular conveyance line 151 is configured with a first annular conveyance line disposed adjacent to the main conveyance line 161 and a second annular conveyance line disposed further on the inner side than the first annular conveyance line and provided so as to be capable of transferring the specimen container carrier 10 to and from the first annular conveyance line. Other configurations, that is, the branch arm 170 disposed at the adjacent part between the main conveyance line 161 and the annular conveyance line 111, and each separator 180 are also provided in the same manner.

In this manner, in the present example, since the specimen input unit 110 and the accommodation unit 150 are configured with a double annular conveyance line (annular conveyance line), classification into two types including an inner circumference and an outer circumference is possible, and the configuration of the conveyance line can be classified into more various types by multiplexing.

Figure 6:
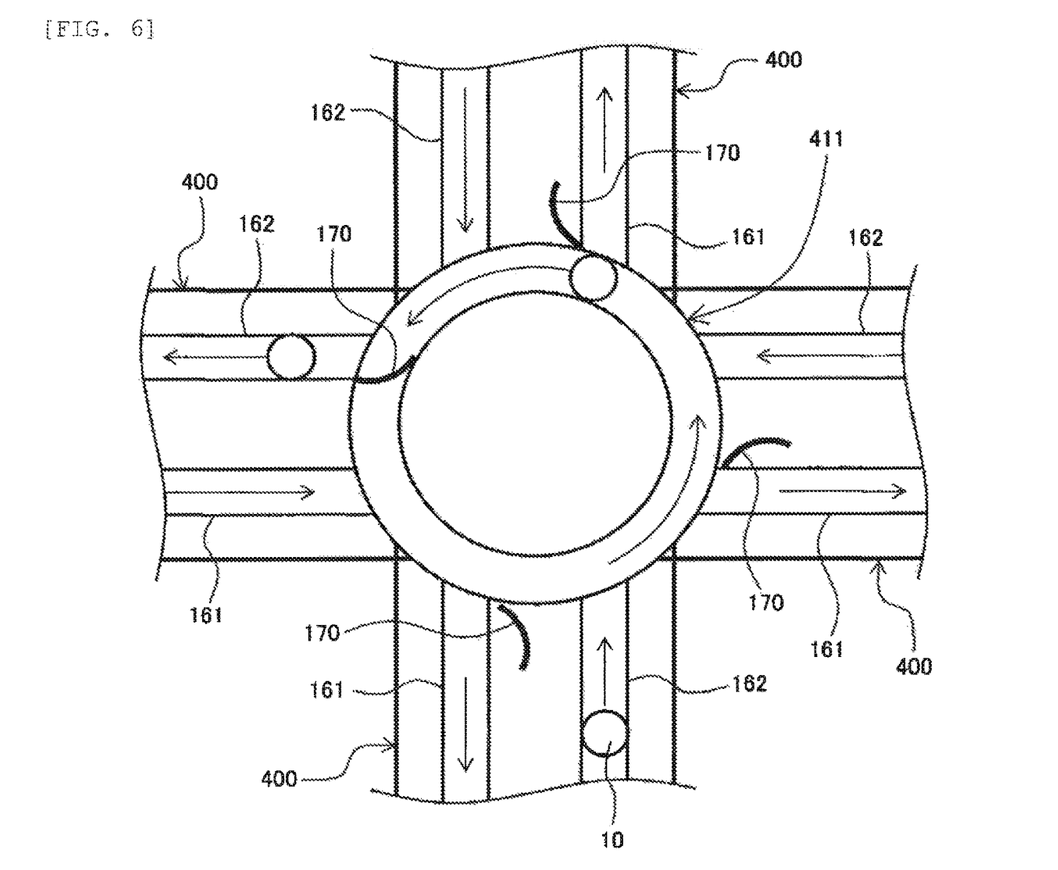
FIG. 6 is a view schematically illustrating a configuration of a conveyance line connecting unit.

FIG. 6 is a view schematically illustrating a configuration of the conveyance line connecting unit. In FIG. 6, a case where four conveyance line units are connected to each other is described as an example.

In FIG. 6, the conveyance line connecting unit 410 includes an annular conveyance line 411 which is a circulation conveyance path that is disposed adjacent to the main conveyance line 161 of the conveyance line unit 400, is disposed so as to be capable of transferring the specimen container carrier 10 to and from the main conveyance line 161, and is capable of circulating and conveying the specimen container carrier 10 separately without using another conveyance line. Here, the annular conveyance line 411 is disposed adjacent (connected) to an upstream side end portion or a downstream side end portion of the main conveyance line 161 of the conveyance line unit 400. In addition, the annular conveyance line 411 is also disposed adjacent (connected) to the upstream side end portion or the downstream side end portion of the return line 162 of the conveyance line unit 400.

Similar to other annular conveyance lines 111, 121, 131, 141 and 151 and the like, the annular conveyance line 411 is configured with a disk that rotates in the horizontal direction and a guide rail that is disposed to surround the rotation center of the disk and guides the movement of the specimen container carrier 10 on the disk.

The branch arms 170 are disposed at the adjacent part (connection part) between the downstream side end portion of the main conveyance line 161 and the annular conveyance line 411 and at the adjacent part (connection part) between the upstream side end portion of the return line 162 and the annular conveyance line 411. When the branch arm 170 is moving on the annular conveyance line 411, the specimen container carrier 10 conveyed on the annular conveyance line 411 is guided by the branch arm 170 and conveyed out to the main conveyance line 161 or the return line 162. In addition, when the branch arm 170 is retracted from the annular conveyance line 411, the specimen container carrier 10 conveyed on the annular conveyance line 411 is circulated and conveyed as it is on the annular conveyance line 411. In addition, the specimen container carrier 10 that has been conveyed on the main conveyance line 161 or the return line 162 is conveyed out from the downstream side end portion thereof to the annular conveyance line 411 and circulated and conveyed on the annular conveyance line 411. Accordingly, it is possible to transfer the specimen container carrier 10 to and from the main conveyance line 161 and the return line 162 and the annular conveyance line 411.

On the main conveyance line 161 and the return line 162 of the conveyance line unit 400, an ID reading device (not illustrated) is disposed at a position on the upstream side with respect to the annular conveyance line 411, and the ID of the specimen container read by the ID reading device is sent to the host computer 500. In addition, the specimen container carrier 10 of which a conveyance destination is specified by the host computer 500 is conveyed out to the desired main conveyance line 161 or the desired return line 162 by the branch arm 170.

Here, a basic structure of the annular conveyance line in the present embodiment will be described in detail with reference to the drawings.

Figure 7:
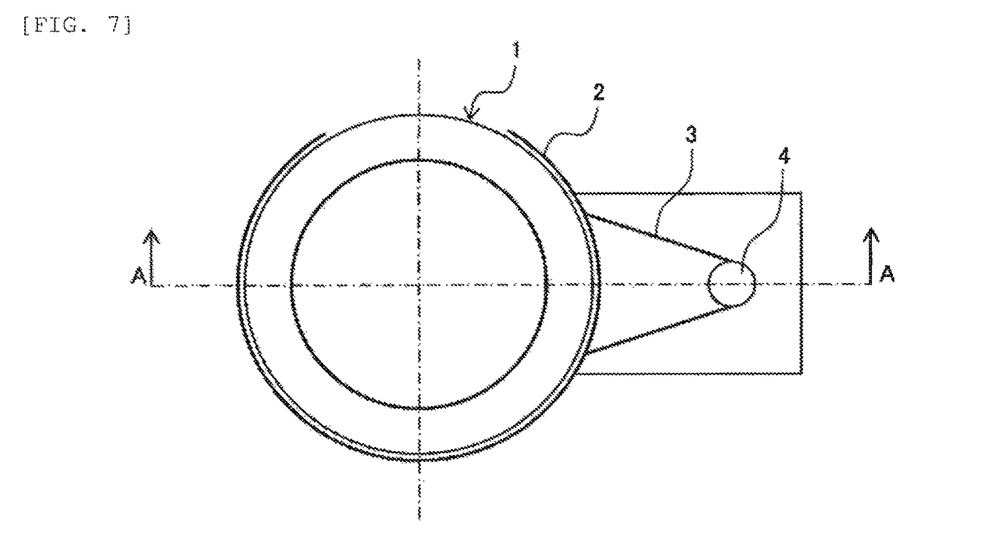
FIG. 7 is a top view schematically illustrating a configuration of the annular conveyance line.
Figure 8:
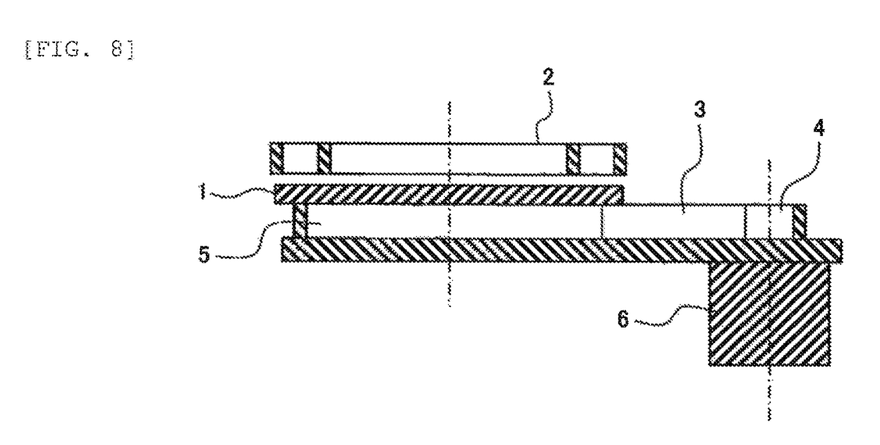
FIG. 8 is a view schematically illustrating a configuration of the annular conveyance line, and is a sectional view taken along the line A-A in FIG. 7.

FIGS. 7 and 8 are views illustrating an example of the basic structure of the annular conveyance line, FIG. 7 is a top view of the annular conveyance line, and FIG. 8 is a sectional view taken along line A-A in FIG. 7.

The annular conveyance line in the present embodiment is roughly configured with the conveyance disk 1, the guide rail 2, a timing belt 3, a drive pulley 4, a driven pulley 5, and a drive motor 6. The conveyance disk 1 is provided so as to be rotatable in the horizontal direction, a driving force is transmitted from the drive pulley 4 connected to the drive motor 6 to the driven pulley 5 connected to the conveyance disk 1 via the timing belt 3, and accordingly, the conveyance disk 1 is driven to rotate. The guide rail 2 is provided above the conveyance disk 1 which is driven to rotate by the rotation of the drive motor 6 and guides the specimen container carrier 10 in a circumferential direction as the conveyance disk 1 rotates. In FIGS. 7 and 8, a case where the guide rail 2 has a double structure is described as an example, the guide rail on the inner circumference side has a circular shape and the guide rail on the outer circumference side has a structure in which apart which receives the specimen container carrier from the main conveyance line is notched. In addition, when the annular conveyance line is configured as a multiple annular conveyance line, any part of the guide rail in the circumferential direction other than the guide rail on the innermost circumference is notched, and the specimen container carrier on the adjacent conveyance lane is transferred via the notched part. It is needless to say that the basic structure of the annular conveyance line is appropriately changed in accordance with the situation of usage as the annular conveyance lines 111, 121, 131, 141, 151, and 411.

In addition, the annular conveyance line 411 may have any configurations as long as the specimen container carrier 10 can be separately circulated and conveyed, and is not limited to the above-described configuration. For example, a polygonal circulation conveyance path (annular conveyance line) using a snake chain or the like may be formed. By using disks or snake chains, there is a merit that the circulation conveyance path can be configured with one motor, and it is possible to make the structure of the mechanism or the driving circuit simple. Further, the present invention is not limited to a case where the four conveyance line units 400 are connected to the conveyance line connecting unit 410, but any number (two or more) conveyance line units 400 may be connected thereto. In addition, although a case where an angle formed by the units of the conveyance line unit 400 connected to the conveyance line connecting unit 410 is 90° is described as an example, the present invention is not limited thereto. When the conveyance line connecting unit 410 has a polygonal circulation conveyance path, it is possible to connect the conveyance line units 400 in a direction of any side of the polygon. In particular, when the conveyance line connecting unit 410 is configured with a circular-shaped circulation conveyance path, the circular shape is formed, and the conveyance line units 400 can be connected in any direction.

The effects of the present embodiment configured as described above will be described.

In the sample test automation system, pre-processing, such as centrifugation processing, plug opening processing, and dispensing processing, is performed before the analysis process, but the type of necessary pre-processing is different depending on a target inspection type. Further, a specimen (so-called urgent specimen) having higher urgency than an ordinary specimen needs to perform the pre-processing with a priority than other ordinary specimens. Therefore, high flexibility is required for conveying the specimens between the units performing each processing in the sample test automation system. Here, for example, a technique in which, in addition to the main conveyance line or the return line, an emergency overtaking line for preferentially conveying and processing an urgent specimen, a branch line for connecting the main conveyance line and the emergency overtaking line, and the like are provided to secure the flexibility in conveyance of the specimen, is known. However, in order to use such a configuration, various related mechanisms are required, and thus, the sample test automation system tends to become larger and more expensive. In recent years, the demand for introducing the sample test automation system has been increasing even in the medium or small scale facilities. At such facilities, the installation area or introduction budget of the sample test automation system is restricted compared to large scale facilities in many cases, and it is expected to reduce the installation area and the accompanying introduction cost.

Meanwhile, in the present embodiment, there are provided: the automatic analysis device 200 for performing an analysis process to analyze a specimen that is to be analyzed; the specimen pre-processing module 100 for performing the pre-processing to cause the specimen to enter a state where the analysis process can be performed; the main conveyance line 161 for conveying the specimen container carrier 10 which accommodates the specimen that is to be analyzed and in which at least one specimen container can be loaded; and the annular conveyance lines 111, 121, 131, 141, 151, and 411 that are disposed adjacent to the main conveyance line 161, are disposed so as to be capable of transferring the specimen container carrier 10 to and from the main conveyance line 161, and are capable of circulating and conveying the specimen container carrier 10 separately without using another conveyance line (for example, return line 162 or the like), and thus, it is possible to secure flexibility in conveyance of specimens while suppressing increases in the installation area.

In addition, the present invention is not limited to each of the above-described embodiments, and includes various modification examples. For example, the above-described embodiments are examples which are described in detail in order to make it easy to understand the present invention, and are not limited to a case where all of the described configurations are necessarily provided. In addition, each of the above-described configurations, functions, and the like may be realized by designing a part or all of these, for example, with an integrated circuit. In addition, each of the above-described configurations, functions, and the like may be realized by software by interpreting and executing a program by which the processor realizes each function.

REFERENCE SIGNS LIST

1: conveyance disk
2: guide rail

3: timing belt
4: drive pulley
5: driven pulley
6: drive motor
10: specimen container carrier
100: specimen pre-processing module (pre-processing device)
110: specimen input unit
111: annular conveyance line
120: specimen confirmation unit
121: annular conveyance line
121*a*: disk
121*b*: guide rail
122: processing unit
123: processing area
130: plug opening unit
131: annular conveyance line
140: dispensing unit
141: annular conveyance line
141*a*: first annular conveyance line
141*b*: second annular conveyance line
142: processing unit
143: processing area
144: tip feeder
145: child specimen container preparation unit
150: accommodation unit
151: annular conveyance line
161: main conveyance line
162: return line
170: branch arm
180: separator
180*a*: downstream side stopper
180*b*: upstream side stopper
200: automatic analysis device (analysis device)
300: specimen input and accommodation module
400: conveyance line unit
410: conveyance line connecting unit
411: annular conveyance line
500: host computer

The invention claimed is:

1. A sample test automation system comprising:
a pre-processing device for performing pre-processing with respect to a specimen;
a main conveyance line for conveying a specimen container carrier capable of mounting at least one specimen container which accommodates the specimen; and
a plurality of annular conveyance lines that are disposed adjacent to the main conveyance line and are arranged inside the pre-processing device in an alternating pattern on opposite sides of a portion of the main conveyance line that is disposed inside the pre-processing device, are disposed so as to be capable of transferring the specimen container carrier to and from the main conveyance line, and are capable of circulating and conveying the specimen container carrier separately without using another conveyance line;
wherein the plurality of annular conveyance lines includes:
a first annular conveyance line disposed adjacent to the main conveyance line; and
a second annular conveyance line disposed radially inside of the first annular conveyance line and provided so as to be capable of transferring the specimen container carrier to and from the first annular conveyance line.

2. The sample test automation system according to claim 1, wherein
the plurality of annular conveyance lines is disposed adjacent to a middle of the main conveyance line.

3. The sample test automation system according to claim 1, wherein
the pre-processing device has a pre-processing unit performing the pre-processing with respect to the specimen accommodated in the specimen container, which is disposed on the annular conveyance line.

4. The sample test automation system according to claim 3, further comprising:
a control unit for switching between passing a plurality of specimen container carriers through the pre-processing unit to circulate on the annular conveyance line, and stopping the plurality of specimen container carriers in the pre-processing unit to execute the pre-processing, in accordance with a priority of the specimens in the specimen containers that are mounted on the plurality of specimen container carriers conveyed on the annular conveyance line.

5. The sample test automation system according to claim 1, wherein
the plurality of annular conveyance lines includes a dispensing means for dispensing the specimen between a first specimen container carrier to be conveyed on the first annular conveyance line and a second specimen container carrier to be conveyed on the second annular conveyance line.

6. The sample test automation system according to claim 1, wherein
each of the plurality of annular conveyance lines is configured with a disk-shaped conveyance disk, a motor that rotates the conveyance disk, and a guide rail that guides the specimen container carrier to be conveyed by the annular conveyance line provided above the conveyance disk.

* * * * *